(12) United States Patent
Watanabe

(10) Patent No.: US 11,646,401 B2
(45) Date of Patent: May 9, 2023

(54) METHOD OF MANUFACTURING ELECTRODE AND METHOD OF MANUFACTURING ALL-SOLID-STATE BATTERY

(71) Applicant: Toyota Jidosha Kabushiki Kaisha, Toyota (JP)

(72) Inventor: Hideaki Watanabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/337,839

(22) Filed: Jun. 3, 2021

(65) Prior Publication Data
US 2021/0384483 A1    Dec. 9, 2021

(30) Foreign Application Priority Data
Jun. 8, 2020   (JP) .............................. JP2020-099229

(51) Int. Cl.
| | |
|---|---|
| *H01M 4/04* | (2006.01) |
| *H01M 10/0562* | (2010.01) |
| *H01M 4/62* | (2006.01) |
| *H01M 4/505* | (2010.01) |
| *H01M 4/485* | (2010.01) |
| *H01M 4/525* | (2010.01) |
| *H01M 4/02* | (2006.01) |
| *H01M 10/0525* | (2010.01) |

(52) U.S. Cl.
CPC ......... *H01M 4/0404* (2013.01); *H01M 4/485* (2013.01); *H01M 4/505* (2013.01); *H01M 4/525* (2013.01); *H01M 4/623* (2013.01); *H01M 10/0562* (2013.01); *H01M 10/0525* (2013.01); *H01M 2004/027* (2013.01); *H01M 2004/028* (2013.01); *H01M 2300/0068* (2013.01)

(58) Field of Classification Search
CPC .................................................. H01M 4/0404
See application file for complete search history.

(56) References Cited

U.S. PATENT DOCUMENTS

| | | | |
|---|---|---|---|
| 2011/0293975 A1 | 12/2011 | Iyori et al. | |
| 2018/0198127 A1* | 7/2018 | Oguro | ................... H01M 4/623 |
| 2020/0358094 A1* | 11/2020 | Oshita | ................. H01M 4/1391 |

FOREIGN PATENT DOCUMENTS

| | | |
|---|---|---|
| JP | 2000-090917 A | 3/2000 |
| JP | 2003-331829 A | 11/2003 |
| JP | 2011-249239 A | 12/2011 |

OTHER PUBLICATIONS

Thermo Scientific "Measuring pH of Non-Aqueous and Mixed Samples" (2014).*

* cited by examiner

*Primary Examiner* — Austin Murata
(74) *Attorney, Agent, or Firm* — Dinsmore & Shohl LLP

(57) ABSTRACT

An electrode slurry is prepared by mixing at least an electrode active material, a sulfide solid electrolyte, a binder, and an organic solvent. The electrode slurry is coated on a surface of a substrate to manufacture an electrode. The electrode active material includes a lithium compound. The binder includes a fluorine-containing polymer. During the preparation of the electrode slurry, the variation range of a potential difference between a pH response electrode and a reference electrode in the electrode slurry is maintained within a predetermined reference range.

3 Claims, 2 Drawing Sheets

METHOD OF MANUFACTURING ELECTRODE AND METHOD OF MANUFACTURING ALL-SOLID-STATE BATTERY

CROSS REFERENCE TO RELATED APPLICATIONS

This non-provisional application is based on Japanese Patent Application No. 2020-099229 filed on Jun. 8, 2020 with the Japan Patent Office, the entire contents of which are hereby incorporated by reference.

BACKGROUND

Field

The present disclosure relates to a method of manufacturing an electrode and a method of manufacturing an all-solid-state battery.

Description of the Background Art

Japanese Patent Laying-Open No. 2000-090917 discloses that, when a dispersion is prepared by dispersing a positive electrode material in water, pH of the dispersion is maintained at 7.1 to 11.2.

SUMMARY

Sulfide solid electrolyte has been a promising electrolyte for all-solid-state batteries. This is because sulfide solid electrolyte has a high ion conductivity.

An electrode for the all-solid-state battery may be manufactured by, for example, a wet process. In other words, an electrode slurry is prepared by mixing an electrode active material, a sulfide solid electrolyte, a binder, and an organic solvent. An electrode is manufactured by coating the electrode slurry on a surface of a substrate.

Due to the characteristics of voltage endurance and the reactivity with the sulfide solid electrolyte, a fluorine-containing polymer is suitable to be used as a binder. However, the fluorine-containing polymer is susceptible to gelation during the preparation of the electrode slurry. Due to the gelation of the fluorine-containing polymer, the viscosity of the electrode slurry increases, which may cause the electrode to suffer from weight variation (uneven coating).

The electrode active material includes a lithium (Li) compound. It is considered that the gelation of the fluorine-containing polymer is caused by components (such as $Li^+$, $Li_2CO_3$ and the like) eluted from the electrode active material. Most of the eluted components are basic. It is considered that the gelation of the fluorine-containing polymer may be inhibited by increasing the concentration of hydrogen ions in the electrode slurry, for example. However, if the concentration of hydrogen ions increases, the elution of $Li^+$ from the electrode active material may be promoted, which may reduce the battery capacity.

If the concentration of hydrogen ions increases, the sulfide solid electrolyte may be degraded, which may decrease the ion conductivity of the sulfide solid electrolyte, for example. Further, if the concentration of hydrogen ions is excessively high, hydrogen sulfide gas may be generated from the sulfide solid electrolyte. In this case, a gas recovery apparatus, a treatment apparatus or the like is required to recover or treat hydrogen sulfide gas.

Conventionally, pH of a water dispersion, for example, is used as an indicator to indicate the eluted components (see, for example, Japanese Patent Laying-Open No. 2000-090917). The water dispersion is prepared by dispersing an electrode active material in water. In general, the larger the pH of the water dispersion is, the greater amount of water-soluble basic components that the electrode active material contains.

However, as described above, the dispersion medium of the electrode slurry is an organic solvent, and thereby, the electrode slurry is free of water. It is difficult to predict the amount of eluted components in an organic solvent from the pH of a water dispersion. Therefore, it is required to find a new indicator that is suitable for the electrode slurry of all-solid-state batteries.

An object of the present disclosure is to inhibit weight variation of an electrode and obtain a desired battery capacity.

Hereinafter, the technical configuration and effects of the present disclosure will be described. It should be noted that the action mechanism according to the present disclosure includes presumption. Whether the action mechanism is correct or not does not limit the scope of claims.

[1] A method of manufacturing an electrode of the present disclosure includes the following steps (A) and (B):

(A) preparing an electrode slurry by mixing at least an electrode active material, a sulfide solid electrolyte, a binder, and an organic solvent; and (B) coating the electrode slurry on a surface of a substrate so as to manufacture an electrode.

The electrode active material includes a lithium compound. The binder includes a fluorine-containing polymer.

During the preparation of the electrode slurry, a variation range of a potential difference between a pH response electrode and a reference electrode in the electrode slurry is maintained within a predetermined reference range.

According to the new finding of the present disclosure, the potential difference between a pH response electrode and a reference electrode in the electrode slurry (will be simply referred to as "potential difference" hereinafter) may be used as an indicator to indicate the eluted components in the organic solvent. The potential difference may be measured directly from the electrode slurry in situ during the preparation of the electrode slurry.

The potential of the pH response electrode fluctuates in response to the pH of a measurement target (liquid). The reference electrode is not affected by the pH of the measurement target, and thereby the potential thereof is substantially constant. The pH response electrode may be, for example, a glass electrode. The pH response electrode may be, for example, an ISFET (Ion Sensitive Field Effect Transistor). The reference electrode may be, for example, a silver/silver chloride electrode.

When the sign of the potential difference measured from the electrode slurry is negative (−) but the absolute value of the potential difference is large, the fluorine-containing polymer is more susceptible to gelation. The reason therefor may be that the influence from the eluted components ($Li^+$ and the like) is greater.

When the sign of the potential difference is negative but the absolute value of the potential difference is small or the sign of the potential difference is positive (+), the elution of $Li^+$ from the electrode active material may be promoted.

In the method of manufacturing an electrode of the present disclosure, the potential difference is set within a reference range. In other words, a lower limit is set for the potential difference so as to sufficiently reduce the weight variation of the electrode. An upper limit is set for the potential difference so as to obtain a desired battery capacity. During the preparation of the electrode slurry, various conditions may be adjusted so as to maintain the variation range of the potential difference within the reference range.

[2] In the method for manufacturing an electrode according to [1], the reference range may be, for example, from −360 mV to −12 mV.

When the potential difference is −360 mV or more, it is possible to reduce the influence from the eluted components ($Li^+$ and the like) in the electrode slurry. In other words, it is possible to reduce the gelation. When the potential difference is −12 mV or less, it is possible to reduce the amount of $Li^+$ eluted from the electrode active material, and it is also possible to reduce the degradation of the sulfide solid electrolyte.

[3] The method for manufacturing an electrode according to [1] or [2] may include the following steps (A1) to (A3):

(A1) preparing a first slurry by mixing at least the sulfide solid electrolyte, the binder, and the organic solvent;

(A2) preparing a second slurry by adding the electrode active material into the first slurry while measuring the potential difference of the first slurry; and (A3) preparing the electrode slurry by mixing the second slurry after the electrode active material is added.

During the addition of the electrode active material, the adding speed of the electrode active material is adjusted so as to maintain the variation range of the potential difference within the reference range.

During the preparation of the electrode slurry, the potential difference may be adjusted by any approach. For example, the potential difference may be adjusted by adjusting the adding speed of the electrode active material. When a large amount of the electrode active material is added at one time, the activity of the eluted components in the electrode slurry rapidly increases. As a result, the potential difference rapidly decreases, which may cause the potential difference to deviate from the reference range. By adjusting the adding speed of the electrode active material, it is expected to reduce the variation range of the potential difference. In the present disclosure, the "adding speed" represents a mass added per unit time.

[4] In the method of manufacturing an all-solid-state battery of the present disclosure, an electrode is manufactured by the method of manufacturing an electrode according to any one of [1] to [3]. Thus, an all-solid-state battery including the electrode is manufactured.

According to the method of manufacturing an all-solid-state battery of the present disclosure, it is possible to reduce the capacity variation of the all-solid-state battery. The reason therefor may be that the weight variation of the electrode is reduced. According to the method of manufacturing an all-solid-state battery of the present disclosure, it is possible to obtain a desired battery capacity. The reason therefor may be that the amount of $Li^+$ eluted from the electrode active material in the electrode slurry is reduced.

The foregoing and other objects, features, aspects and advantages of the present disclosure will become more apparent from the following detailed description of the present disclosure when taken in conjunction with the accompanying drawings.

DETAILED DESCRIPTION

Hereinafter, an embodiment of the present disclosure (which may be referred to as "the present embodiment" hereinafter) will be described. However, the following description does not limit the scope of claims.

In the present embodiment, for example, an expression such as "−360 mV to −12 mV" or the like indicates a numerical range that includes both boundary values unless otherwise specified. For example, "−360 mV to −12 mV" indicates a numerical range of "−360 mV or more and −12 mV or less".

In the present embodiment, the expression "consisting essentially of" means that in addition to the components, it is allowed to include those components (for example, inevitable impurities) that are generally assumed to be present in the field of the art.

In the present embodiment, when a compound is represented by a stoichiometric composition formula such as "$Li_2S$", the stoichiometric composition formula is merely a representative example. For example, lithium sulfide may contain Li and S at any composition ratio without being limited to the composition ratio of "Li:S=2:1".

<Method of Manufacturing Electrode>

Figure 1:
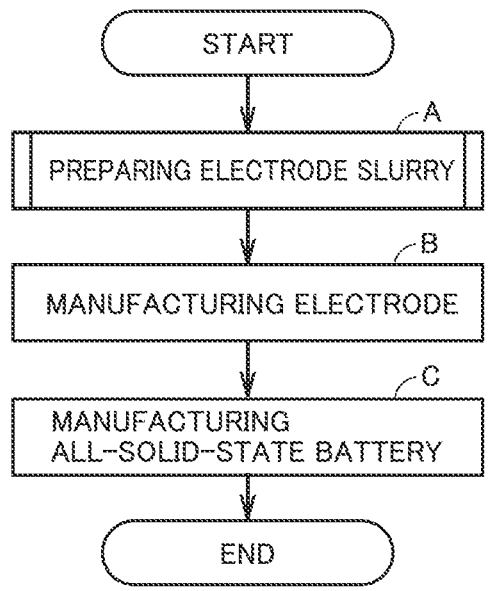
FIG. 1 is a schematic flowchart illustrating a manufacturing method according to the present embodiment.

FIG. 1 is a schematic flowchart illustrating a manufacturing method according to the present embodiment.

The method of manufacturing an electrode according to the present embodiment includes "(A) preparing an electrode slurry" and "(B) manufacturing an electrode". The method of manufacturing an electrode according to the present embodiment may be used to manufacture a positive electrode or a negative electrode.

<<(A) Preparing Electrode Slurry>>

The method of manufacturing an electrode according to the present embodiment includes preparing an electrode slurry by mixing at least an electrode active material, a sulfide solid electrolyte, a binder, and an organic solvent. First, each material included in the electrode slurry will be described.

(Electrode Active Material)

The electrode active material occludes and releases $Li^+$. The electrode active material is a powder (a group of particles). The electrode active material may have a D50 of 1 μm to 30 μm, for example. "D50" refers to a particle size in volume-based particle size distribution at which the cumulative particle volume accumulated from the side of small sizes reaches 50% of the total particle volume. D50 may be measured by using a laser-diffraction particle size distribution analyzer.

The electrode active material includes a lithium compound. A lithium compound according to the present embodiment refers to such a compound that contains at least Li. The electrode active material may consist essentially of a lithium compound, for example.

The electrode active material may be, for example, a positive electrode active material. In other words, the method of manufacturing an electrode according to the present embodiment may be used to manufacture a positive electrode. The electrode active material may include, for example, at least one selected from the group consisting of lithium cobalt oxide, lithium nickel oxide, lithium manganese oxide, lithium nickel cobalt manganese oxide, lithium nickel cobalt aluminate, and lithium iron phosphate.

The electrode active material may be, for example, a negative electrode active material. In other words, the method of manufacturing an electrode according to the present embodiment may be used to manufacture a negative electrode. The electrode active material may include, for example, lithium titanium oxide or the like.

For example, a coating film may be formed on the surface of the electrode active material. For example, the surface of the positive electrode active material may be coated with lithium niobium oxide or the like.

(Sulfide Solid Electrolyte)

The sulfide solid electrolyte forms an ion conduction path in the electrode. The sulfide solid electrolyte is a powder. The sulfide solid electrolyte may have a D50 of 0.1 μm to 10 μm, for example. The sulfide solid electrolyte may have a D50 of 0.5 μm to 5 μm, for example. The sulfide solid electrolyte may have a D50 of 0.8 μm to 2.5 μm, for example.

The volume ratio of the electrode active material to the sulfide solid electrolyte may be, for example, from "the electrode active material:the sulfide solid electrolyte=1:9" to "the electrode active material:the sulfide solid electrolyte=9:1". The volume ratio of the electrode active material to the sulfide solid electrolyte may be, for example, from "the electrode active material:the sulfide solid electrolyte=3:7" to "the electrode active material:the sulfide solid electrolyte=9:1". The volume ratio of the electrode active material to the sulfide solid electrolyte may be, for example, from "the electrode active material:the sulfide solid electrolyte=5:5" to "the electrode active material:the sulfide solid electrolyte=8:2".

The sulfide solid electrolyte may be in the form of a glass, for example. The sulfide solid electrolyte may be formed into glass ceramics (also referred to as "crystallized glass"), for example. The sulfide solid electrolyte includes sulfur (S) and Li. The sulfide solid electrolyte may further include phosphorus (P) or the like, for example. In other words, the sulfide solid electrolyte may include lithium phosphorous sulfide or the like. The sulfide solid electrolyte may further include a halogen element or the like, for example. The sulfide solid electrolyte may further include iodine (I), bromine (Br) or the like, for example. The sulfide solid electrolyte may further include oxygen (O), silicon (Si), germanium (Ge), tin (Sn) or the like, for example.

The sulfide solid electrolyte may include, for example, at least one selected from the group consisting of $Li_2S-P_2S_5$, $Li_2S-SiS_2$, $LiI-Li_2S-SiS_2$, $LiI-Si_2S-P_2S_5$, $LiI-LiBr-Li_2S-P_2S_5$, $LiI-Li_2S-P_2S_5$, $LiI-Li_2O-Li_2S-P_2S_5$, $LiI-Li_2S-P_2O_5$, $LiI-Li_3PO_4-P_2S_5$, and $Li_2S-P_2S_5-GeS_2$.

In the present embodiment, for example, "$Li_2S-P_2S_5$" indicates that the sulfide solid electrolyte is composed of a component derived from "$Li_2S$" and a component derived from "$P_2S_5$". $Li_2S-P_2S_5$ may be manufactured by, for example, a mechanochemical reaction between $Li_2S$ and $P_2S_5$. The mixing ratio of $Li_2S$ and $P_2S_5$ is not limited. For example, $Li_2S$ and $P_2S_5$ may satisfy the relationship of "$Li_2S:P_2S_5=50:50$" to "$Li_2S:P_2S_5=90:10$" in terms of the ratio of amount of substance (molar ratio). For example, $Li_2S$ and $P_2S_5$ may satisfy the relationship of "$Li_2S:P_2S_5=60:40$" to "$Li_2S:P_2S_5=80:20$" in terms of the ratio of amount of substance.

(Binder)

The binder may be, for example, a powder. The binder may be, for example, a solution. The binder may be, for example, a particle dispersion. The binder includes a fluorine-containing polymer. The binder may consist essentially of a fluorine-containing polymer, for example. The binder may include, for example, a fluorine-containing polymer and a solvent (or a dispersion medium). The solvent or the dispersion medium may be the same as the organic solvent to be described below, for example.

The fluorine-containing polymer bonds the electrode materials together. The fluorine-containing polymer includes a constitutional unit containing fluorine. The "constitutional unit" represents an atomic group that constitutes a part of the basic structure of a polymer chain. The smallest constitutional unit that constitutes a regular polymer chain by repetition is particularly referred to as a "constitutional repeating unit". The fluorine-containing polymer may include, for example, at least one selected from the group consisting of a constitutional unit derived from vinylidene fluoride (VdF), a constitutional unit derived from tetrafluoroethylene (TFE), and a constitutional unit derived from hexafluoropropene (HFP).

The fluorine-containing polymer may be, for example, a homopolymer. The fluorine-containing polymer may be, for example, a copolymer. The copolymer may be any of a random copolymer, an alternating copolymer, a block copolymer, or a graft copolymer. The fluorine-containing polymer may include, for example, at least one selected from the group consisting of polyvinylidene fluoride (PVdF), polytetrafluoroethylene (PTFE) and vinylidene fluoride-hexafluoropropene copolymer (PVdF-HFP).

The amount of the fluorine-containing polymer to be added is not limited. For example, the amount of the fluorine-containing polymer to be added may be 0.1 parts by mass to 10 parts by mass relative to 100 parts by mass of the electrode active material.

(Organic Solvent)

The organic solvent serves as a dispersion medium. The organic solvent may be, for example, a nonpolar solvent. Generally, the nonpolar organic solvent has a low reactivity with the sulfide solid electrolyte. However, a polar solvents such as water, N-methyl-2-pyrrolidone (NMP) or the like is likely to react with the sulfide solid electrolyte.

The organic solvent may include, for example, carboxylic acid ester. The organic solvent may include, for example, at least one selected from the group consisting of ethyl acetate, butyl acetate, butyl butyrate, pentyl butyrate, hexyl butyrate, butyl pentanoate, pentyl pentanoate, hexyl pentanoate, butyl hexanoate, pentyl hexanoate, and hexyl hexanoate.

The amount of the organic solvent to be added is not limited. For example, the organic solvent may be added so that the solid fraction in the electrode slurry is 40% to 80%. The "solid fraction" indicates the total mass fraction of components other than the organic solvent.

(Other Materials)

As long as the electrode slurry includes the above materials, the electrode slurry may further include the other materials. For example, the electrode slurry may further include a conductive material. The conductive material forms an electron conduction path in the electrode. The conductive material may include any component. The conductive material may include, for example, at least one selected from the group consisting of vapor phase growth carbon fiber (VGCF), carbon nanotube, carbon black, and graphene flake. The amount of the conductive material to be added is not limited. For example, the amount of the conductive material to be added may be 0.1 parts by mass to 10 parts by mass relative to 100 parts by mass of the electrode active material.

The electrode slurry may further include, for example, an organic acid or the like. The organic acid added to the electrode slurry may neutralize the base in the electrode slurry, and is expected to reduce the influence from the components (such as $Li^+$) eluted from the electrode active material. The organic acid may include, for example, butyric acid or the like.

(Slurry Manufacturing Apparatus)

Figure 2:
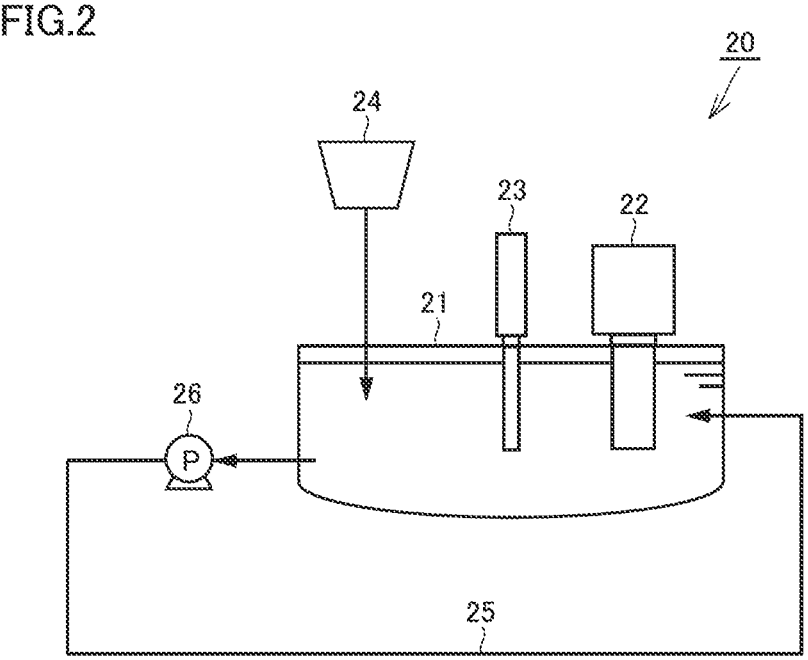
FIG. 2 is a schematic view illustrating an exemplar slurry manufacturing apparatus according to the present embodiment.

FIG. 2 is a schematic view illustrating an exemplar slurry manufacturing apparatus according to the present embodiment.

In the present embodiment, any mixing device, any stirring device, any dispersing device or the like may be used. The slurry manufacturing apparatus of FIG. 2 is merely an example.

The slurry manufacturing apparatus 20 includes a mixing vessel 21, a stirring device 22, a potential difference measuring device 23, a material feeder 24, a circulation pipe 25, and a pump 26.

Various materials are added into the mixing vessel 21 from the material feeder 24. The material feeder 24 may be configured to control the adding speed of the materials. The mixing vessel 21 may be, for example, a metal container or the like. The mixing vessel 21 may be attached with a water-cooling jacket, for example. The temperature of the electrode slurry may be adjusted, for example, in the range of 25° C.±10° C. The stirring device 22 stirs and mixes the materials in the mixing vessel 21. The stirring device 22 may be, for example, an ultrasonic homogenizer or the like. For example, an ultrasonic homogenizer (model type "US-600AT") manufactured by NISSEI Corporation may be used. The amplitude of the oscillator may be, for example, about 40 μm.

The materials are mixed in the mixing vessel 21 to prepare an electrode slurry. The electrode slurry is pumped out by the pump 26. The electrode slurry circulates through the circulation pipe 25, and flows back into the mixing vessel 21 again.

(Measurement of Potential Difference)

The potential difference measuring device 23 may include, for example, a main body (a display, a controller and the like) and a sensor. For example, a pH meter (product name "LAQUAact D-72") or an equivalent device manufactured by HORIBA, Ltd. may be used as the main body. The sensor is immersed in the liquid material in the mixing vessel 21. The sensor may be disposed near a central position of the mixing vessel 21, for example. The sensor includes a pH response electrode and a reference electrode. For example, a composite electrode in which a pH response electrode and a reference electrode are integrated may be used as the sensor. The pH response electrode may be, for example, a glass electrode or an ISFET. The ISFET tends to respond faster in organic solvents than the glass electrode. For example, a semiconductor electrode (product name "Flat ISFET (0040-10) sensor tip") or an equivalent device manufactured by HORIBA, Ltd. may be used as the sensor.

During the preparation of the electrode slurry, the potential difference measuring device 23 may be used to measure the potential difference at a predetermined interval, for example. For example, the potential difference may be measured at an interval of 1 to 60 seconds. For example, the potential difference may be measured at an interval of 10 seconds. If the variation range of the potential difference during the preparation of the electrode slurry falls within a predetermined reference range, the electrode slurry is regarded as a qualified product. If the variation range of the potential difference deviates from the reference range, the electrode slurry is regarded as a defective product.

Various operations may be performed in response to the variation of the potential difference so as to maintain the potential difference within the reference range. In other words, a feedback control may be performed. For example, the organic acid or the like mentioned above may be added. For example, the adding speed of the materials or the like may be adjusted.

The reference range of the potential difference may be determined based on the result of a preliminary experiment, for example. A lower limit of the reference range may be determined based on the relationship between the variation range of the potential difference and the weight variation of the finally obtained electrode, for example. An upper limit of the reference range may be determined based on the relationship between the variation range of the potential difference and the battery capacity, for example.

The reference range of the potential difference may be, for example, from −360 mV to −12 mV. When the potential difference is −360 mV or more, it is possible to reduce the influence from the eluted components in the electrode slurry. The lower limit of the reference range may be, for example, −354 mV, −270 mV, or −235 mV.

When the potential difference is −12 mV or less, it is possible to reduce the amount of $Li^+$ eluted from the electrode active material, and it is also possible to reduce the degradation of the sulfide solid electrolyte. The upper limit of the reference range may be, for example, −115 mV, −120 mV, or −189 mV.

(Mixing Procedure)

In the present embodiment, the mixing procedure is not limited. For example, all the materials may be mixed at one time. For example, the materials may be added sequentially and mixed sequentially.

Figure 3:
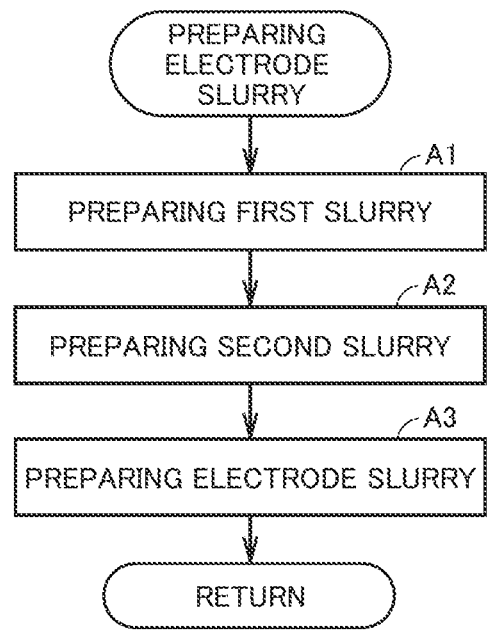
FIG. 3 is a schematic flowchart illustrating an exemplar mixing procedure according to the present embodiment.

FIG. 3 is a schematic flowchart illustrating an exemplar mixing procedure according to the present embodiment.

For example, the electrode slurry may be prepared by the mixing procedure of FIG. 3. In other words, the method of manufacturing an electrode according to the present embodiment may include, for example, "(A1) preparing a first slurry", "(A2) preparing a second slurry", and "(A3) preparing the electrode slurry".

(A1) Preparing First Slurry

Firstly, materials other than the electrode active material are mixed. In other words, at least the sulfide solid electrolyte, the binder, and the organic solvent may be mixed. For example, the sulfide solid electrolyte, the binder, the conductive material, and the organic solvent may be mixed. The materials other than the electrode active material are mixed to prepare the first slurry. For example, the materials may be mixed by an ultrasonic homogenizer. The mixing time is not limited. The mixing time may be, for example, 10 minutes to 2 hours. The mixing time may be, for example, 10 minutes to 1 hour.

(A2) Preparing Second Slurry

Next, the electrode active material is added into the first slurry. The electrode active material may be added while the first slurry is being stirred. The second slurry is prepared by adding the electrode active material. The addition of the electrode active material may elute $Li^+$ or the like into the organic solvent. As a result, the potential difference may rapidly decrease. Therefore, the electrode active material may be gradually added while monitoring the potential difference of the first slurry. For example, during the addition of the electrode active material, the adding speed of the electrode active material may be adjusted so as to maintain the variation range of the potential difference within the reference range. The electrode active material may be added continuously. The electrode active material may be divided several parts and added stepwise.

(A3) Preparing Electrode Slurry

After the entire amount of the electrode active material is added, the second slurry is mixed to prepare an electrode slurry. For example, the second slurry may be mixed by an ultrasonic homogenizer. The mixing time is not limited. The mixing time may be, for example, 1 hour to 24 hours. The mixing time may be, for example, 3 hours to 6 hours.

<<(B) Manufacturing Electrode>>

The method of manufacturing an electrode according to the present embodiment includes coating the electrode slurry on a surface of a substrate so as to manufacture the electrode.

The substrate may be, for example, an electrode current collector. The substrate may be, for example, an aluminum (Al) foil, a copper (Cu) foil, a nickel (Ni) foil, or the like. In the present embodiment, any applicator may be used. The applicator may be, for example, a slot die applicator, a direct gravure applicator, a blade applicator, or the like. According to the present embodiment, it is possible to reduce the uneven coating. The reason therefor is that the gelation of the electrode slurry is reduced.

The coated electrode slurry may be dried by any method. For example, the electrode slurry may be dried by natural drying, hot air drying, infrared drying, or the like. For example, the electrode slurry may be dried on a hot plate. The electrode slurry is dried to form an electrode. After drying, the electrode may be subjected to pressing, for example. For example, the electrode may be cut into a predetermined size. Thus, the electrode is obtained. The electrodes may have any thickness. The electrode may have a thickness of, for example, 5 µm to 500 µm.

Modified Example

The method of controlling gelation of a fluorine-containing polymer by measuring the potential difference of an organic slurry may be applied to, for example, an electrode slurry that does not contain a sulfide solid electrolyte. The method may be applied to any application other than the electrode slurry. The method may be applied to, for example, an organic slurry that does not contain an electrode active material and a sulfide solid electrolyte. The organic slurry may contain, for example, a substance capable of releasing a basic component into the organic solvent. The organic slurry may contain, for example, a basic filler (such as alumina, calcium carbonate, or the like).

<Method of Manufacturing All-solid-state Battery>

The method of manufacturing an all-solid-state battery according to the present embodiment further includes "(C) manufacturing an all-solid-state battery" in addition to "(A) preparing an electrode slurry" and "(B) manufacturing an electrode" (see FIG. 1).

<<(A) Preparing Electrode Slurry & (B) Manufacturing Electrode>>

At least one of a positive electrode and a negative electrode is manufactured by the method of manufacturing an electrode mentioned above.

<<(C) Manufacturing All-Solid-State Battery>>

The method of manufacturing an all-solid-state battery according to the present embodiment includes manufacturing an all-solid-state battery including an electrode. For example, only a positive electrode may be manufactured by the method of manufacturing an electrode mentioned above. For example, only a negative electrode may be manufactured by the method of manufacturing an electrode mentioned above. For example, both of the positive electrode and the negative electrode may be manufactured by the method of manufacturing an electrode mentioned above. The all-solid-state battery may be manufactured by any method as long as it includes the electrode manufactured by the manufacturing method mentioned above.

Figure 4:
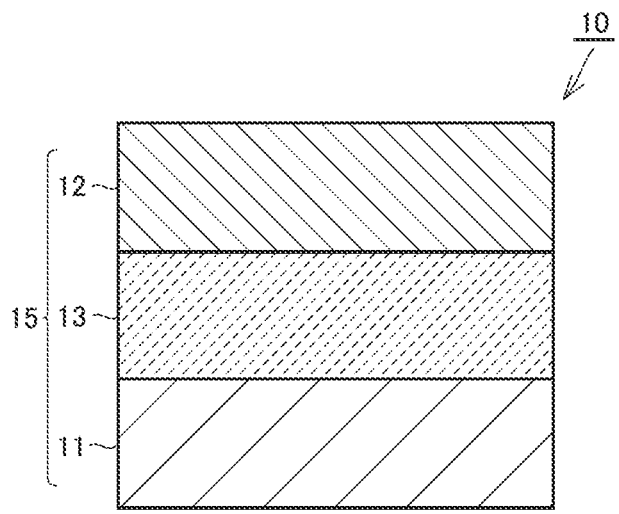
FIG. 4 is a schematic cross-sectional view illustrating an all-solid-state battery according to the present embodiment.
Figure 4:
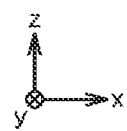

FIG. 4 is a schematic cross-sectional view illustrating an all-solid-state battery according to the present embodiment.

An all-solid-state battery 10 includes a battery element 15. The battery element 15 is formed by stacking a positive electrode 11, a separator layer 13, and a negative electrode 12 in this order. For example, the positive electrode 11, the separator layer 13, and the negative electrode 12 may be integrated by pressing.

The all-solid-state battery 10 may include a single battery element 15. The all-solid-state battery 10 may include a plurality of battery elements 15. The plurality of battery elements 15 may be stacked in the z-axis direction of FIG. 4, for example. The plurality of battery elements 15 may form, for example, a series circuit. The plurality of battery elements 15 may form, for example, a parallel circuit.

The separator layer 13 separates the positive electrode 11 and the negative electrode 12 from each other. The separator layer 13 includes a sulfide solid electrolyte and a binder. The separator layer 13 may be formed by coating a slurry.

The battery element 15 may be sealed in a housing (not shown). The housing may be, for example, a metal case or the like. The housing may be, for example, a pouch made of aluminum laminate film.

Example

An example of the present disclosure (will be referred to as "the present example" hereinafter) will be described below. However, the following description does not limit the scope of claims.

<Manufacturing Electrode and All-Solid-State Battery>

An electrode (positive electrode) and an all-solid-state battery (evaluation battery) were manufactured by the following manufacturing methods of No. 1 to No. 5. In the present example, the sulfide solid electrolyte was glass ceramics.

<<No. 1>>

(Manufacturing Positive Electrode)

Ethanol, 1 mmol of lithium ethoxide, and 1 mmol of pentaethoxyniobium were mixed to prepare a precursor solution.

Lithium nickel cobalt manganese oxide powder was prepared as the positive electrode active material. The positive electrode active material and the precursor solution were mixed by using a tumbling fluid bed granulation coating apparatus (model type "MP-01") manufactured by PowRex Corporation. The resulting mixture was dried. After drying, the mixture was calcined at 200° C. for 5 hours.

Thus, the surface of the positive electrode active material was coated with a coating film of lithium niobium oxide. The thickness of the coating film was 10 nm.

The following materials were prepared:
sulfide solid electrolyte: LiI—$Li_2S$—$P_2S_5$ (D50=0.8 µm)
binder solution: PVdF (5 mass %) as the solute, and butyl butyrate as the solvent
conductive material: VGCF
organic solvent: butyl butyrate.

A slurry manufacturing apparatus 20 as illustrated in FIG. 2 was prepared. The sulfide solid electrolyte, the binder, the conductive material, and the organic solvent were added into the mixing vessel 21. The materials in the mixing vessel 21 were mixed by using an ultrasonic homogenizer (model type "US-600AT" manufactured by NISSEI Corporation). Thus, a first slurry was prepared. The amplitude of the oscillator was 40 μm. The mixing time was 30 minutes.

A pH meter (product name "LAQUAact D-72" manufactured by HORIBA, Ltd.) and a sensor (product name "Flat ISFET (0040-10) sensor tip" manufactured by HORIBA, Ltd.) were prepared as the potential difference measuring device 23. The sensor was disposed near a central position of the mixing vessel 21. The sensor was immersed in the first slurry.

The positive electrode active material was added into the first slurry from the material feeder 24 at an adding speed of 1000 g/min. The addition amount of the positive electrode active material is controlled so that the volume ratio of the positive electrode active material to the sulfide solid electrolyte is "the positive electrode active material:the sulfide solid electrolyte=7:3". The potential difference was measured and recorded every 10 seconds from the start to the end of the addition of the positive electrode active material.

The entire amount of the electrode active material was added to prepare a second slurry. The second slurry was mixed by an ultrasonic homogenizer. Thus, an electrode slurry (positive electrode slurry) was prepared. The amplitude of the oscillator was 40 μm. The mixing time was 5 hours.

An Al foil was prepared as the positive electrode current collector. The electrode slurry was coated on the surface of the Al foil by using a blade applicator. Thus, a positive electrode was manufactured. The positive electrode was naturally dried. After natural drying, the positive electrode was further dried on a hot plate at 100° C. The drying time was 30 minutes.

(Manufacturing Negative Electrode)
The following materials were prepared:
negative electrode active material: lithium titanium oxide
sulfide solid electrolyte: LiI—Li$_2$S—P$_2$S$_5$ (D50=0.8 μm)
binder solution: PVdF (5 mass %) as the solute, and butyl butyrate as the solvent
organic solvent: butyl butyrate.

The negative electrode active material, the sulfide solid electrolyte, the binder, and the organic solvent were added into a polypropylene (PP) container. The materials in the container were mixed for 30 seconds by using an ultrasonic disperser (model type "UH-50" manufactured by SMT Co., Ltd.). The container was set in a shaker (model type "TTM-1" manufactured by Sibata Scientific Technology Ltd.). The container was shaken by the shaker for 30 minutes. Thus, an electrode slurry (a negative electrode slurry) was prepared.

A Cu foil was prepared as the negative electrode current collector. The electrode slurry was coated on the surface of the Cu foil by using a blade applicator. Thus, a negative electrode was manufactured. The negative electrode was naturally dried. After natural drying, the negative electrode was further dried on a hot plate at 100° C. The drying time was 30 minutes.

(Manufacturing Separator Layer)
The following materials were prepared:
sulfide solid electrolyte: LiI—Li$_2$S—P$_2$S$_5$ (D50=2.5 μm)
binder solution: butyl rubber (5 mass %) as the solute, and heptane as the solvent
organic solvent: heptane.

The sulfide solid electrolyte, the binder, and the organic solvent were added into a PP container. The materials in the container were mixed for 30 seconds by using an ultrasonic disperser (model type "UH-50" manufactured by SMT Co., Ltd.). The container was set in a shaker (model type "TTM-1" manufactured by Sibata Scientific Technology Ltd.). The container was shaken by the shaker for 30 minutes. Thus, a separator slurry was prepared.

An Al foil was prepared as a temporary support. The separator slurry was coated on the surface of the Al foil by using a blade applicator. Thus, a separator layer was manufactured. The separator layer was naturally dried. After natural drying, the separator layer was further dried on a hot plate at 100° C. The drying time was 30 minutes.

(Manufacturing All-Solid-State Battery)
A pressing mold was prepared. The separator layer was placed in the mold. The separator layer was pressed under a pressure of 1 ton/cm$^2$. Next, the positive electrode was placed on one main surface of the separator layer. The positive electrode and the separator layer were pressed together under a pressure of 1 ton/cm$^2$. Next, the negative electrode was placed on the other main surface of the separator layer. The negative electrode, the separator layer and the positive electrode were pressed together under a pressure of 6 ton/cm$^2$. Thus, a battery element was formed. A pouch made of aluminum laminate film was prepared as the housing. The battery element was sealed in the housing. Thus, an evaluation battery (all-solid-state lithium ion battery) was manufactured. The evaluation battery had an electrode area of 1 cm$^2$. The designed capacity of the evaluation battery was 1.6 mAh. In each manufacturing method, five evaluation batteries were manufactured.

<<No. 2>>
The electrode and the evaluation battery were manufactured in the same manner as in No. 1 except that the adding speed of the electrode active material was changed to 10 g/min in "manufacturing a positive electrode".

<<No. 3>>
The electrode and the evaluation battery were manufactured in the same manner as in No. 1 except that the adding speed of the electrode active material was changed to 100 g/min in "manufacturing a positive electrode".

<<No. 4>>
The electrode and the evaluation battery were manufactured in the same manner as in No. 1 except that the adding speed of the electrode active material was changed to 20 g/min in "manufacturing a positive electrode".

<<No. 5>>
In "manufacturing a positive electrode", firstly, a half of the total amount of the electrode active material was added at an adding speed of 1000 g/min. After the electrode active material was added, the second slurry was mixed for 60 minutes. After mixing for 60 minutes, the remaining half of the electrode active material was added at an adding speed of 1000 g/min. After the entire amount of the electrode active material was added, the second slurry was mixed for 5 hours to prepare an electrode slurry. Except these, the electrode and the evaluation battery were manufactured in the same manner as in No. 1.

<Evaluation>
<<Weight Variation>>
Five sample pieces were prepared from the positive electrode by punching. The five sample pieces were prepared at substantially equal intervals in the width direction of the positive electrode. The width direction is defined as a direction orthogonal to the moving direction of the substrate during coating. The mass of each sample piece was measured. The variation in mass for the five sample pieces was calculated. The results are listed in Table 1 below. In the column of "weight variation" in Table 1, for example, "+12" represents such a value in percentage that is obtained by subtracting the median value from the maximum value and dividing the difference by the median value, and "−12" represents such a value in percentage that is obtained by subtracting the median value from the minimum value and dividing the difference by the median value. The smaller the absolute value of each value listed in the column of "weight variation" in Table 1 is, the smaller the weight variation is.

<<Battery Capacity>>

The battery capacity (the initial discharge capacity) of each evaluation battery was measured by constant current-constant voltage charging and constant current discharging. The current rate of charging and discharging was 1/3 C. "C" is a symbol used to represent the magnitude of a current rate. At a current rate of 1C, the evaluation battery is completely discharged from its rated capacity in one hour. The variation in battery capacity for the five evaluation batteries was calculated. The results are listed in Table 1 below. In the column of "capacity variation" in Table 1, for example, "+12" represents such a value in percentage that is obtained by subtracting the median value from the maximum value and dividing the difference by the median value, and "−12" represents such a value in percentage that is obtained by subtracting the median value from the minimum value and dividing the difference by the median value. The smaller the absolute value of each value listed in the column of "capacitance variation" in Table 1 is, the smaller the capacitance variation is.

TABLE 1

| | Method of Manufacturing Electrode | | All-solid-state Battery | |
|---|---|---|---|---|---|
| No. | Electrode Active Material Adding Speed [g/min] | Electrode Slurry Variation Range of Potential Difference [mV] | Electrode Weight Variation [%] | Battery Capacity (Median Value) [mAh] | Capacity Variation [%] |
| 1 | 1000 | −394 to −120 | ±12 | 1.6 | ±12 |
| 2 | 10 | −235 to 5 | ±3 | 0.9 | ±3 |
| 3 | 100 | −360 to −115 | ±3 | 1.6 | ±3 |
| 4 | 20 | −270 to −12 | ±2 | 1.6 | ±2 |
| 5 | 1000 | −354 to −189 | ±3 | 1.6 | ±3 |

<Results>

In No. 1, the potential difference significantly decreased during the preparation of the electrode slurry. The reason therefor may be that the adding speed of the electrode active material was fast. In No. 1, the weight variation of the electrode was large. The reason therefor may be that the gelation of the fluorine-containing polymer was promoted due to the decrease in the potential difference. It is considered that there is a correlation between the capacity variation and the weight variation of the electrode in No. 1.

In No. 2, the potential difference temporarily exhibited a positive value during the preparation of the electrode slurry. The reason therefor may be that the adding speed of the electrode active material was slow. In No. 2, the sulfide solid electrolyte may suffer from degradation. The degradation of the sulfide solid electrolyte may increase the battery resistance, for example. In No. 2, the battery capacity was small. The reason therefor may be that the elution of $Li^+$ from the electrode active material was promoted when the potential difference was shifted to the positive side.

In No. 3 to No. 5, the weight variation of the electrode was small, and the desired battery capacity was obtained. The reason therefor may be that the variation range of the potential difference was appropriate during the preparation of the electrode slurry. From the results of No. 1 to No. 5, in the present example, the reference range may be set, for example, from −360 mV to −12 mV.

The results of the present example tends to illustrate that the potential difference may be adjusted by, for example, the adding speed of the electrode active material.

The present embodiment and the present example are illustrative in all aspects. The present embodiment and the present example are non-restrictive. For example, it is originally intended that certain configurations may be extracted from the present embodiment and the present example and may be combined appropriately.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A method of manufacturing an electrode comprising:
preparing a first slurry by mixing at least a sulfide solid electrolyte, a binder, and an organic solvent;
preparing a second slurry by adding an electrode active material into the first slurry while measuring a potential difference of the first slurry; and
preparing an electrode slurry by mixing the second slurry after the electrode active material is added, preparing the electrode slurry comprises mixing at least the electrode active material, the sulfide solid electrolyte, the binder, and the organic solvent; and
coating the electrode slurry on a surface of a substrate so as to manufacture an electrode,
the electrode active material including a lithium compound,
the binder including a fluorine-containing polymer,
during the preparation of the electrode slurry, a variation range of a potential difference between a pH response electrode and a reference electrode in the electrode slurry being maintained within a predetermined reference range, the potential difference is measured when a temperature of the electrode slurry is in a range of from 15° C. to 35° C., and
during the addition of the electrode active material, an adding speed of the electrode active material is adjusted so as to maintain the variation range of the potential difference within the reference range.

2. The method of manufacturing an electrode according to claim 1, wherein
the reference range is from −360 mV to −12 mV.

3. A method of manufacturing an all-solid-state battery comprising:
manufacturing the electrode using the method of manufacturing an electrode according to claim 1; and
manufacturing an all-solid-state battery including the electrode.

* * * * *